United States Patent
Huang et al.

(10) Patent No.: US 6,628,461 B2
(45) Date of Patent: Sep. 30, 2003

(54) METHOD AND APPARATUS FOR A POLARIZATION BEAM SPLITTER/COMBINER WITH AN INTEGRATED OPTICAL ISOLATOR

(75) Inventors: Yonglin Huang, Milpitas, CA (US); Shuging Ma, San Jose, CA (US); Meng Ma, San Jose, CA (US)

(73) Assignee: Finisar Corporation, Sunnyvale, CA (US)

( * ) Notice: Subject to any disclaimer, the term of this patent is extended or adjusted under 35 U.S.C. 154(b) by 0 days.

(21) Appl. No.: 09/900,091

(22) Filed: Jul. 5, 2001

(65) Prior Publication Data

US 2002/0089745 A1 Jul. 11, 2002

Related U.S. Application Data (60) Provisional application No. 60/261,179, filed on Jan. 10, 2001.

(51) Int. Cl.[7] .................................................. G02B 5/30
(52) U.S. Cl. ....................... 359/494; 359/485; 359/488; 359/497; 385/31; 385/39
(58) Field of Search ................................. 359/484, 485, 359/494, 497; 385/31, 33, 39

(56) References Cited

U.S. PATENT DOCUMENTS

| | | | |
|---|---|---|---|
| 4,548,478 A | 10/1985 | Shirasaki | |
| 5,402,509 A | * 3/1995 | Fukushima | 385/33 |
| 6,018,418 A | 1/2000 | Pan et al. | 359/495 |
| 6,038,357 A | 3/2000 | Pan | 385/24 |

FOREIGN PATENT DOCUMENTS

| | | |
|---|---|---|
| EP | 0 50 199 A | 12/1992 |
| JP | 59176721 | 10/1984 |
| JP | 60130934 | 7/1985 |
| JP | 61130921 | 6/1986 |
| JP | 06113920 | 4/1994 |

* cited by examiner

*Primary Examiner*—Audrey Chang
*Assistant Examiner*—Craig Curtis
(74) *Attorney, Agent, or Firm*—Workman, Nydegger & Seeley (57) ABSTRACT

An integrated optical polarization beam splitter/combiner and isolator (IPBC) is disclosed. In one disclosed aspect, the IPBC may comprise a first birefringent crystal optically configured to receive two rays incident at an angle, a rotator configured to rotate the rays received, and a second birefringent crystal positioned to receive the rays from the rotator. The IPBC may be configured to combine the rays in a forward direction, and isolate said two rays in a reverse direction.

33 Claims, 8 Drawing Sheets

METHOD AND APPARATUS FOR A POLARIZATION BEAM SPLITTER/COMBINER WITH AN INTEGRATED OPTICAL ISOLATOR

CROSS-REFERENCE TO RELATED APPLICATIONS

This application claims the priority date of U.S. Provisional application 60/261,179, filed Jan. 10, 2001.

BACKGROUND

1. Field of the Disclosure

The disclosure relates generally to fiber optics, and in particular, to a polarization beam splitter/combiner featuring an integrated optical isolator.

2. The Prior Art

BACKGROUND

Fiber optical networks are becoming increasingly faster and more complex. For example, networks compliant with the OC48 standard for synchronous optical networks (capable of a 2.5 Gb/s data rate) are being replaced by newer networks compliant with OC192 (10 Gb/s). Networks compliant with OC768 (40 Gb/s) networks are already on the horizon. At the same time, research is underway to transmit more and more channels down a single fiber through the use of dense wavelength division multiplexing (DWDM) technology. Eighty-channel systems are currently being deployed; it is anticipated that network density will increase in the future.

Key to this expansion are technologies such as thin film deposition and diffraction gratings which allow optical components to be manufactured in increasingly smaller packages. As optical networks continue to carry more channels at faster rates, component size is becoming a key limiting factor.

Central to any optical network are optical amplifiers. Optical amplifiers such as Raman and erbium-doped fiber amplifiers (EDFA) are responsible for amplifying and transmitting optical signals over long distances.

Figure 1:
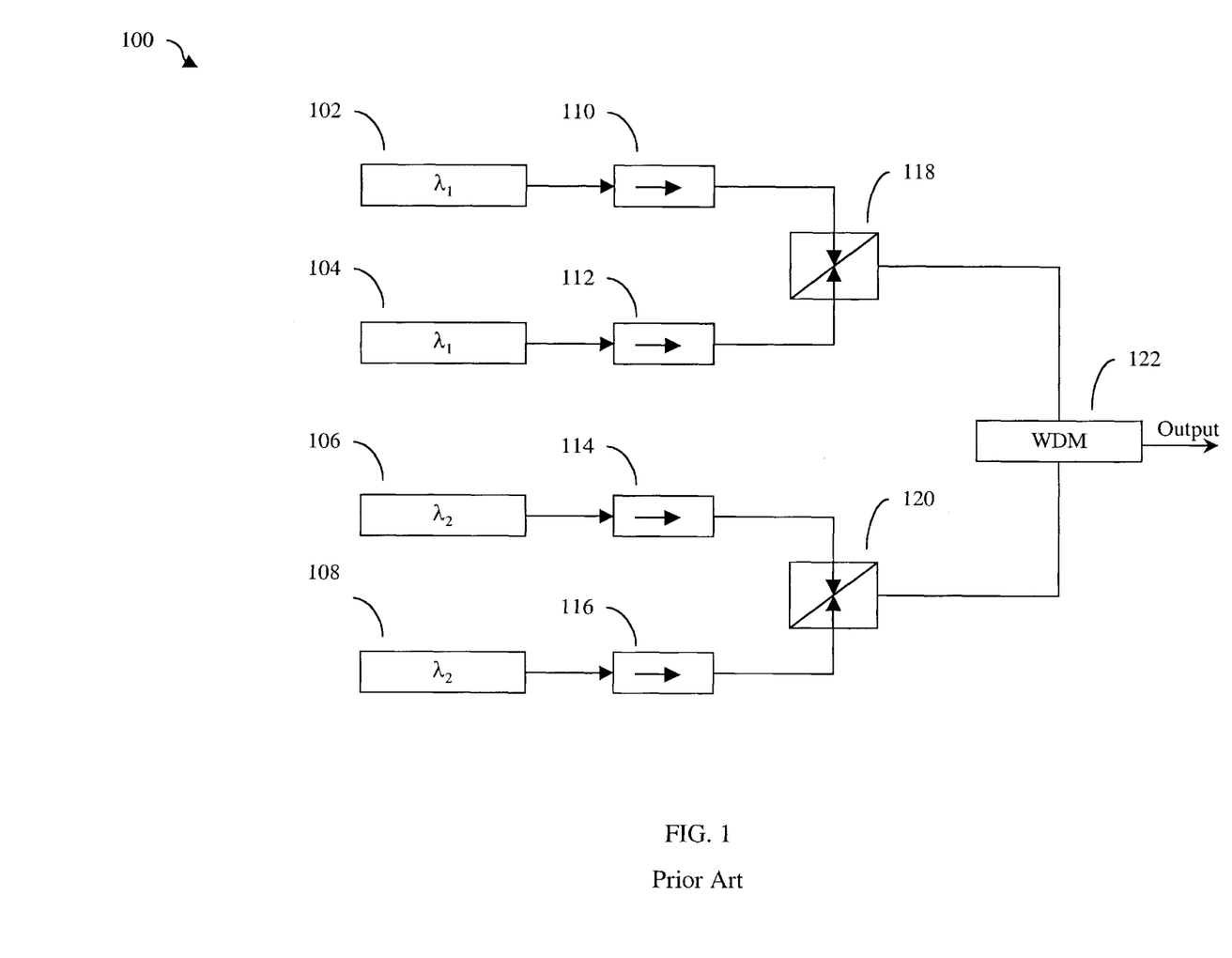
FIG. 1 is a functional block diagram of a prior art Raman pump model.

FIG. 1 shows a prior art operational block diagram of a typical Raman pump model 100. The Raman pump 100 is formed using several discrete components, including four isolators 110, 112, 114, and 116; and two polarization beam combiners (PBC) 118 and 120 in addition to pump lasers (not shown).

In operation, two light sources 102 and 104 feed the two isolators 110 and 112, respectively. The output of the isolators 110 and 112 are fed to PBC 118, where the two signal are combined into a single signal. Likewise, two light sources 106 and 108 feed the isolators 114 and 116, respectively. The output of isolators 114 and 116 feed PBC 120, where the two signals are combined into one signal. The two signals from the PBCs 118 and 120 are then multiplexed and output by WDM 122.

As is appreciated by those skilled in the art, isolators and PBCs are essential components of any optical amplification system. Currently, optical amplifiers must separately employ isolators and PBCs as discrete components. As the complexity of optical networks continues to grow, utilizing discrete components has certain disadvantages. For example, discrete components take up space and are expensive. Furthermore, discrete components must be optically coupled, which may lead to performance degradation.

SUMMARY

An integrated optical polarization beam splitter/combiner and isolator (IPBC) is disclosed. In one aspect, a disclosed IPBC may comprise a first birefringent crystal optically configured to receive two rays incident at an angle γ; a rotator configured to rotate the two rays received from the first wedge; a second birefringent crystal positioned to receive the two rays from the rotator; and wherein the integrated optical polarization beam splitter/combiner and isolator is configured to combine the two rays in a forward direction, and isolate the two rays in a reverse direction.

In another aspect of a disclosed IPBC, the first and second birefringent crystals may comprise the same material, and have the same wedge angle θ.

In a further aspect of a disclosed IPBC, the relationship between the wedge angle θ and the angle γ may be defined as:

$$\gamma = 2 \cdot \text{arc Sin}\,[(n_o - n_e)\cdot\tan\theta].$$

In yet a further aspect of a disclosed IPBC, the crystals may have optic axes which are 45° apart. Furthermore, the two rays may have orthogonal polarizations, and may be combined interior to the second crystal, and exit the second crystal as a third ray.

In a further aspect of a disclosed IPBC, an incoming beam port may be employed for launching the two rays through a lens into the first crystal. The incoming beam port may comprise a plurality of PM fibers, the PM fibers each having corresponding principal axes; the plurality of PM fibers disposed together as a grouping, the grouping having corresponding secondary axes; and whereby each the plurality of PM fibers is aligned such that the corresponding principal axes of each the plurality of the PM fiber and the secondary axes of the grouping intersect at a predetermined angle.

Another aspect of a IPBC is disclosed, which may comprise a first birefringent means for receiving and refracting a first ray and a second ray incident at an angle γ such that the first ray comprises an e-ray with respect to the first wedge, and the second ray comprises an o-ray with respect to the first wedge; rotating means for rotating the two rays received from the first wedge; second birefringent means for receiving and refracting the first and second rays from the rotator such that the first ray comprises an o-ray with respect to the second wedge, and the second ray comprises an e-ray with respect to the second wedge; and wherein the second crystal is optically configured to combine the first and second rays in a forward direction, and the first crystal is optically configured to diverge the first and second rays in a reverse direction.

A method for combining light in a forward direction and isolating light in a reverse direction is disclosed. In one aspect, the method may comprise refracting a first ray and a second ray incident at an angle γ such that the first ray comprises an e-ray with respect to the first wedge, and the second ray comprises an o-ray with respect to the first wedge; rotating the two rays received from the first wedge; and refracting the first and second rays from the rotator such that the first ray comprises an o-ray with respect to the second wedge, and the second ray comprises an e-ray with respect to the second wedge.

DETAILED DESCRIPTION

Persons of ordinary skill in the art will realize that the following description is illustrative only and not in any way limiting. Other modifications and improvements will readily suggest themselves to such skilled persons having the benefit of this disclosure. In the following description, like reference numerals refer to like elements throughout.

Figure 2A:
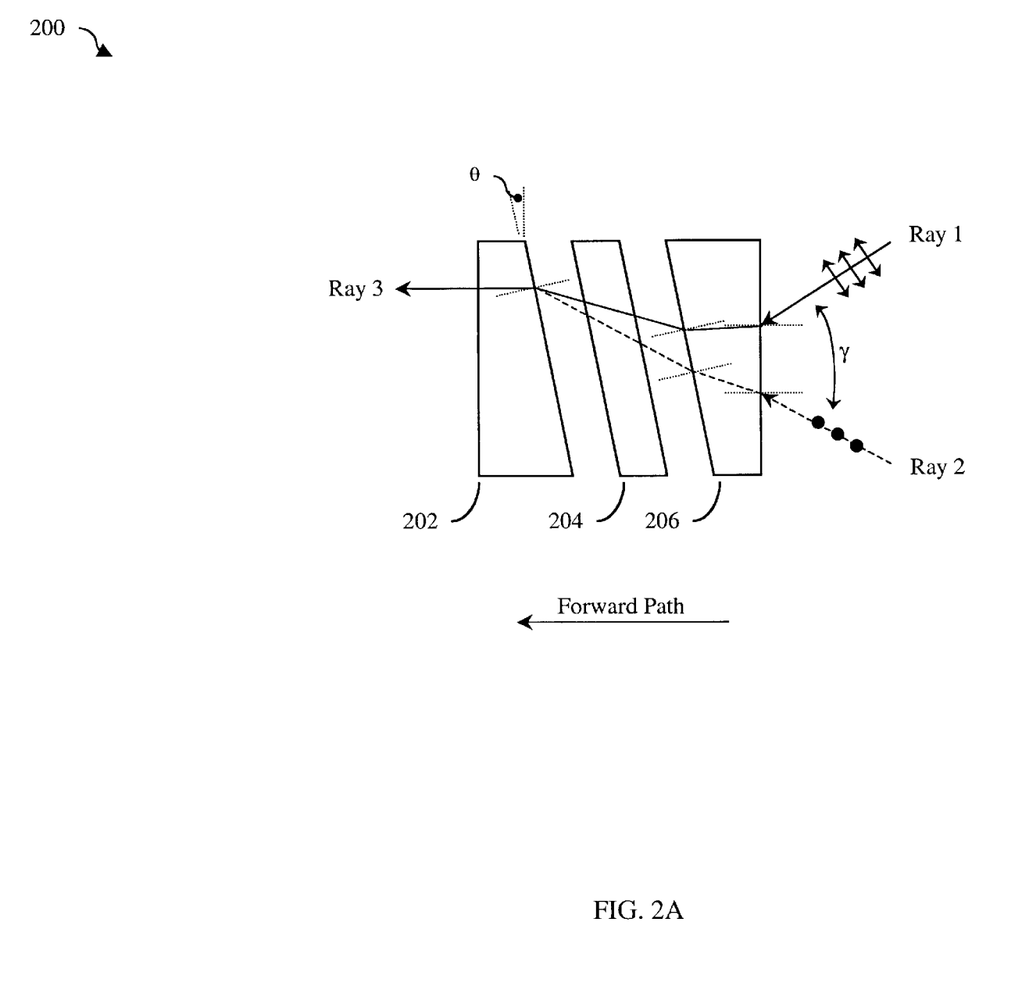
FIG. 2A is a cross-sectional diagram of an integrated polarization beam splitter/combiner and isolator core showing operation in the forward direction.

Referring first to FIG. 2A, an integrated optical isolator and polarization beam splitter/combiner (IPBC) core 200 is shown. IPBC core 200 includes birefringent crystals 202 and 206 formed in a variety of manners known in the art, such as from a thin film coating on a right angle prism (RAP), or prisms such as a Wallaston prism, Nicol prism, Rochon prism, or other forms. Furthermore, crystals 202 and 206 may be formed from a variety of polarizing or birefringent materials known in the art, such as Calcite, $YVO_4$, Rutile, $LiNbO_3$, and other crystalline materials. Crystals 202 and 206 have a wedge cutting angle θ. In one aspect of a disclosed optical isolator, the two crystals comprise the same material, such that the crystal angle θ is the same for both crystals.

Disposed between crystals 202 and 206 is a Faraday rotator 204. Faraday rotator 204 may comprise a conventional rotator formed from latching or non-latching garnet. The Faraday rotator 206 may be configured to rotate the polarity of light incident in the forward direction (from right to left in FIG. 2A) by 45°, and in the reverse direction by −45°.

Light may be launched into crystal 206 as shown in FIG. 2A, where the Rays 1 and 2 shown being launched into crystal 206 at an angle γ, as measured between the rays. The relationship of the divergent angle γ and the angle θ is:

$$\gamma = 2 \cdot \arcsin\left[(n_o - n_e) \cdot \tan\theta\right]$$

where $n_o$ and $n_e$ are the refractive indices of the optical birefringent wedges. The angle θ may range from 0° to $\theta_o$, where $\theta_o$ is the critical angle. As is known by those skilled in the art, the critical angle is the angle at which internal reflection occurs, and is determined by the index of refraction of the material used in the wedges.

In one disclosed aspect of an IPBC, the optic axis cutting angles for the crystals 202 and 206 are 45° apart. For example, one crystal may have optic axis angle of 0° or 90°, while the other crystal may be +/−45°. The optic axis may be chosen based upon the desired depending upon the desired Faraday rotation direction.

In operation, two rays of light, Ray 1 and Ray 2, are launched into crystal 206 having orthogonal polarization directions. As can be seen from FIG. 2A, Ray 1 has a plane of polarization which is parallel to the paper, and Ray 2 has a plane of polarization which is normal to the plane of the paper. For this example, we will assume that crystal 206 has an optic axis which is normal to the paper plane.

As Rays 1 and 2 pass through crystal 206, they will be refracted. With Ray 1 having a plane of polarization parallel with the paper, Ray 1 will be refracted as the o-ray. Conversely, with Ray 2 having a plane of polarization perpendicular to the plane of the paper, Ray 2 will be refracted as the e-ray.

When Rays 1 and 2 exit crystal 206, they will be launched into the Faraday rotator 204. In one aspect of a disclosed optical isolator, the Faraday rotator 204 will rotate the polarization of Rays 1 and 2 by +45°.

After passing the Faraday rotator 204, Rays 1 and 2 will be launched into crystal 202. Crystal 202 is located such that Rays 1 and 2 will intersect prior to the exterior or outside edge of crystal 202. It is contemplated that the Rays 1 and 2 may be directed so as to combine either interior or exterior to crystal 202.

Having had their polarization rotated +45°, Ray 1 is now the e-ray with respect to crystal 202, and Ray 2 is now the o-ray with respect to crystal 202. The result is that crystal 202 will refract Rays 1 and 2 such that they will be combined and exit as one ray, Ray 3. Thus, an optical combiner has been realized.

Figure 2B:
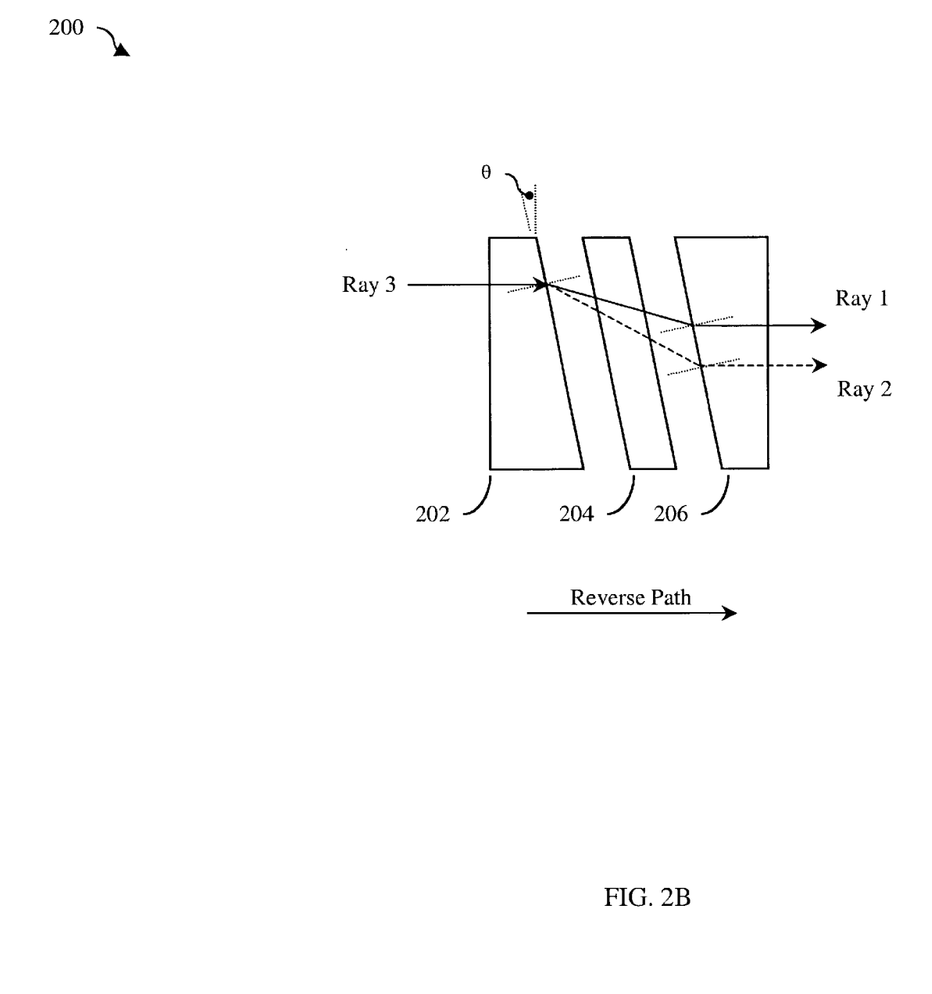
FIG. 2B is a cross-sectional diagram of a integrated polarization beam splitter/combiner and isolator core showing operation in the reverse direction.

Referring now to FIG. 2B, the operation is described in the reverse direction, from left to right. When Ray 3 enters crystal 202, it will be decomposed into two beams, Ray 1 and Ray 2. Ray 1 is the e-ray with respect to crystal 202, and Ray 2 is the o-ray with respect to crystal 202, and Rays 1 and 2 will have orthogonal polarization directions. After passing through the Faraday rotator 204, Rays 1 and 2 will have their polarization directions rotated by −45°. Now, in contrast to the forward direction, Ray 1 remains the e-ray with respect to crystal 206, and Ray 2 remains the o-ray with respect to crystal 206. Thus, after passing through crystal 206, Rays 1 and 2 will exit in parallel paths separated in space. Therefore, Rays 1 and 2 will not exit at the angle γ, with which they entered crystal 206. Since the Rays 1 and 2 travel different entry and exit paths, an optical isolator has been realized.

Figure 2C:
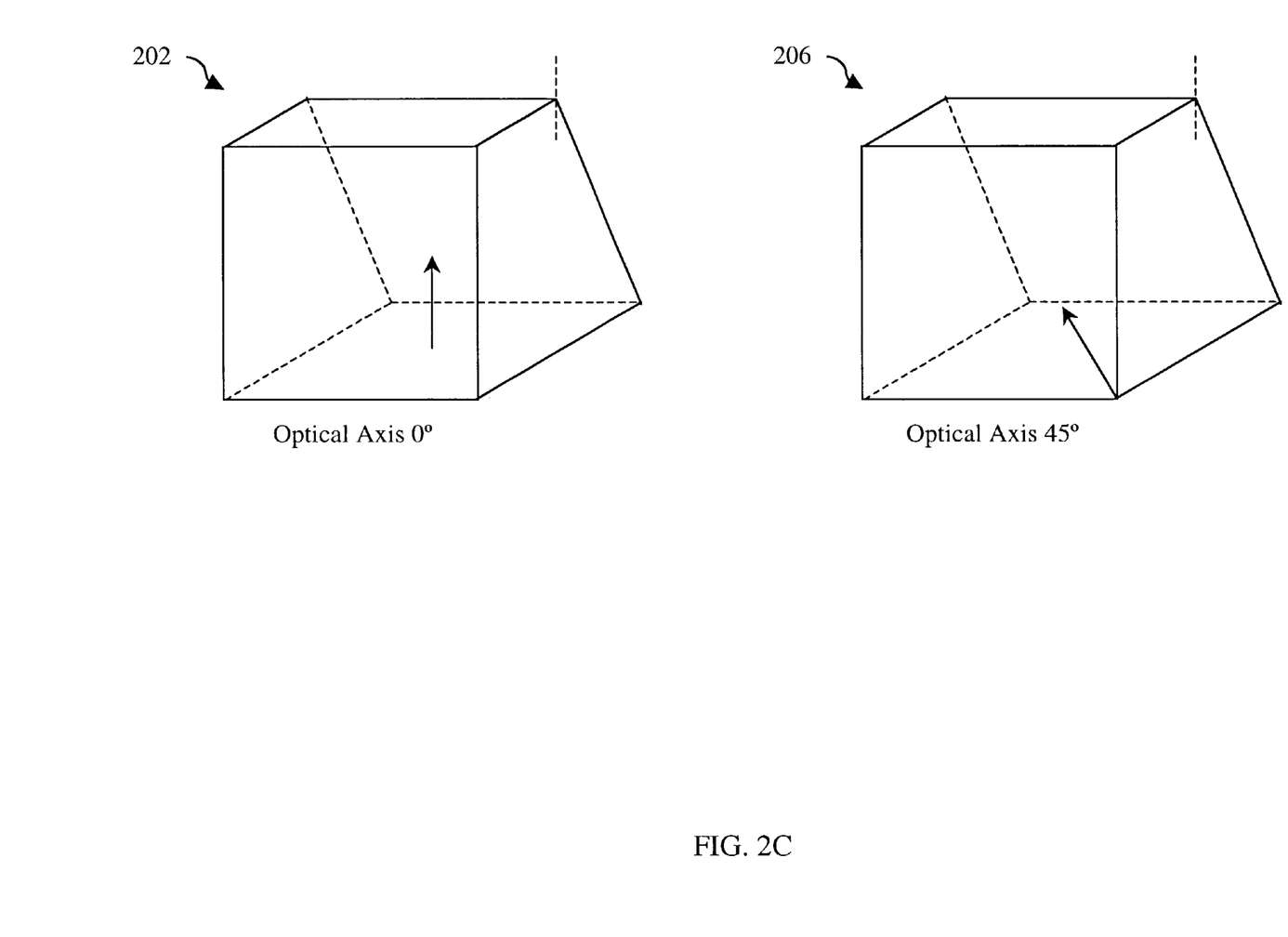
FIG. 2C is a diagram showing the optical axes of crystals illustrated in FIGS. 2A and 2B.

Referring now to FIG. 2C, diagrams of crystals 202 and 206 are shown. FIG. 2C further shows the optical axes of crystals in accordance with one aspect of a disclosed optical IPBC, in which the optical axes for the crystals 202 and 206 are chosen such that they are 45° or 135° apart from each other. For example, the optic axis of crystal 206 may be 0° with respect to its edge, and the optic axis of crystal 202 may be 45° with respect to its edge.

Figure 3:
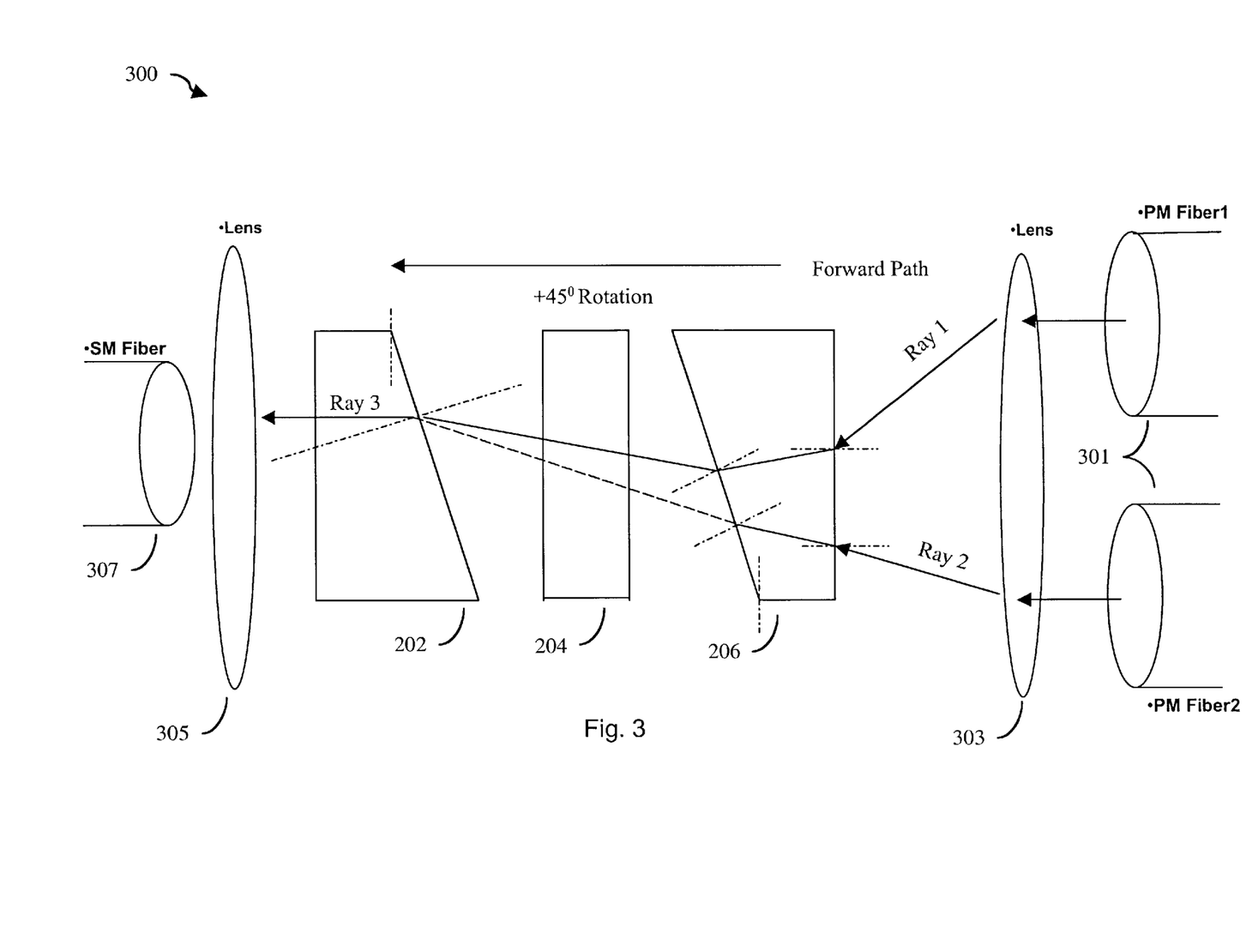
FIG. 3 is a diagram of birefringent crystals suitable for use with the present disclosure.

FIG. 3 is a diagram of an integrated polarization beam/splitter combiner and isolator coupled to optical fibers. FIG. 3 includes crystals 202 and 206 and rotator 204 as described above. FIG. 3 further includes the pair of incoming beam ports 301 which carry Rays 1 and 2. In one aspect of the disclosure, polarization maintaining (PM) fibers are used for the beams to be combined. The output of the PM fibers 301 is then fed to a conventional lens 303 for launching Ray 1 and Ray 2 into crystal 206 at the angle γ.

FIG. 3 further includes a conventional lens 305 for receiving light from crystal 202. The light from lens 303 may then be launched into a conventional single mode fiber 301.

The incoming beam ports 301 may comprise any PM pigtail pair known in the art. However, the inventors have found that the optical axes of the PM fibers may be advantageously aligned for use in the optical devices of the present disclosure.

Figure 4:
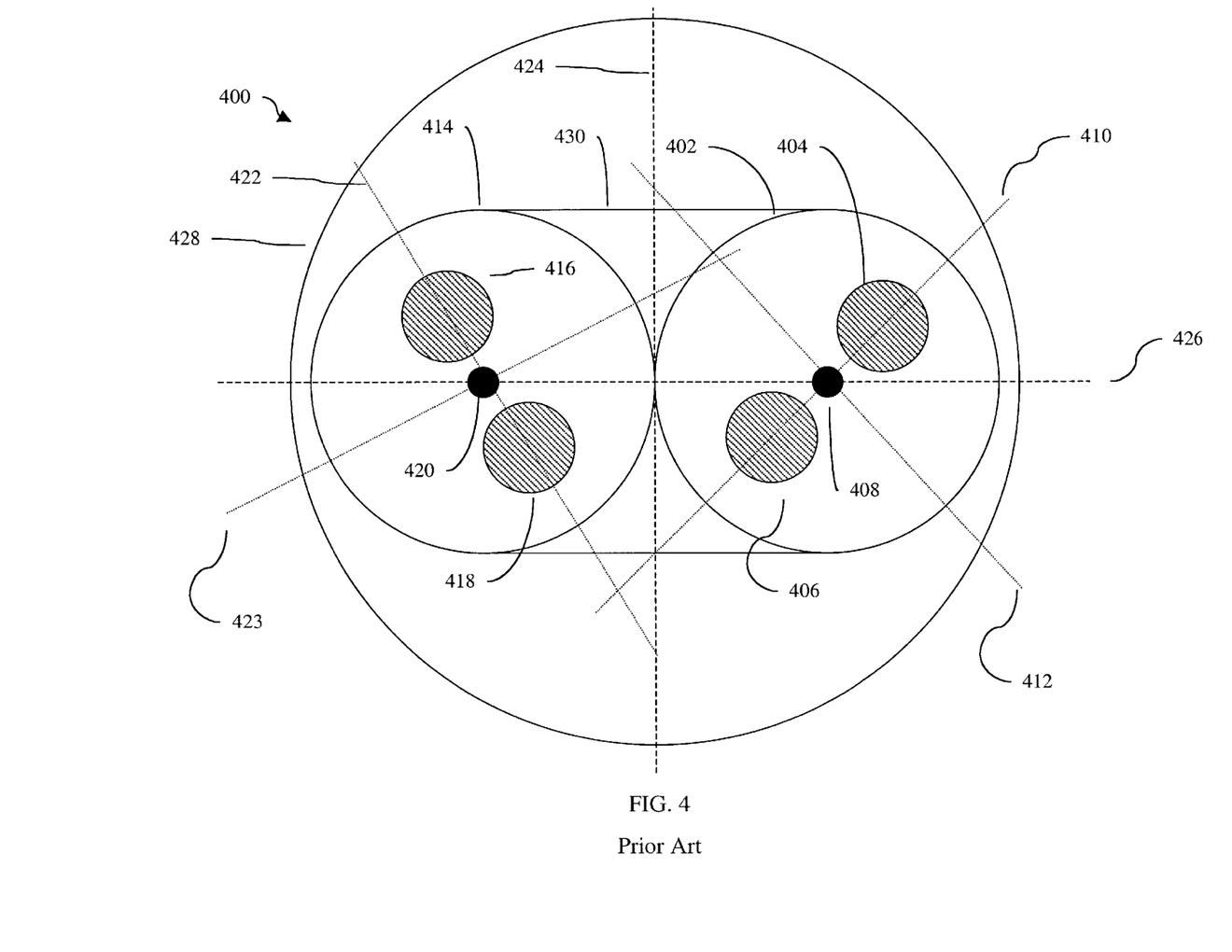
FIG. 4 is a cross-sectional diagram of a prior art PM fiber pair.

FIG. 4 is a cross-sectional diagram of one orientation of PM fibers in a fiber pigtail pair as exists in the prior art. FIG. 4 shows a pigtail pair 400 which includes a first PM fiber 402 and a second PM fiber 414. First PM fiber 402 includes stress applying parts 404 and 406, and a core 408, all disposed within first PM fiber 402 as known in the art. First PM fiber 402 has a corresponding fast axis 412, and a corresponding slow axis 410.

Pigtail pair 400 also includes a second PM fiber 414, stress applying parts 416 and 418, and a core 420. Second PM fiber 414 also has a corresponding fast axis 423, and a corresponding slow axis 422.

Typically, first and second PM fibers 402 and 414 are laid adjacent to each other and affixed to each other with an adhesive standard in the art such as epoxy. The PM fibers are then disposed within a ferrule 428. A typical ferrule 428 usually has a rectangular or "race track" shape opening 430 to accommodate both the first and second PM fibers 402 and 414.

Of particular relevance is the effect affixing PM fibers to each other has on the extinction ratio (ER) factor of the PM fibers. When first and second PM fibers are affixed to each other, the stress of the process forms a secondary fast axis 424 and a secondary slow axis 426 within the pigtail pair 400. These secondary axes optically influence both first and second PM fibers 402 and 414. Additionally, as can be seen by inspection of FIG. 4, if first and second PM fibers 402 and 414 are disposed in an arbitrary manner, then the secondary fast and slow axes 424 and 426 may intersect the corresponding fast and slow axes of the first and second PM fibers 402 and 414 at an arbitrary angle. Having axes intersect at arbitrary angles lowers the ER of the pigtail pair because the polarization direction of light traveling through each PM fiber in the pigtail pair is not maintained along the slow or fast axes of the fiber.

Figure 5:
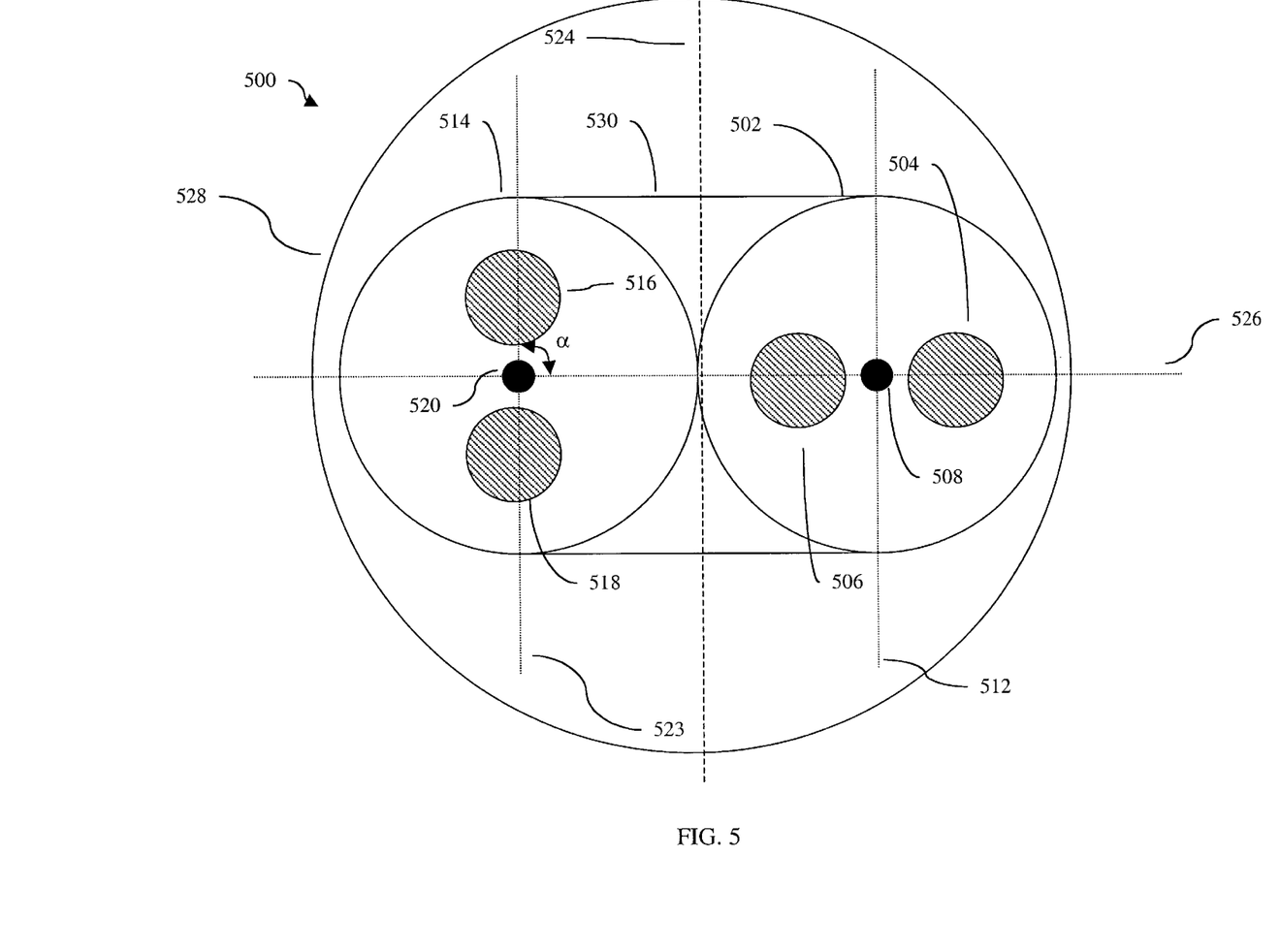
FIG. 5 is a cross-sectional diagram of a PM fiber pair.

FIG. 5 is a cross-sectional diagram of a pigtail pair 500 configured in accordance with the present disclosure. The pigtail pair 500 includes similar elements as shown and described in FIG. 4 and similar matter is designated with similar designations in FIG. 5.

FIG. 5 shows a pigtail pair 500 including a first PM fiber 502 and a second PM fiber 514. First PM fiber 502 includes stress applying parts 504 and 506, and a core 508, all disposed within first PM fiber 502 as known in the art. First PM fiber 502 has a corresponding fast axis 512 and slow axis 510.

Pigtail pair 500 also includes a second PM fiber 514, stress applying parts 516 and 518, and a core 520. Second PM fiber 514 also has a corresponding fast axis 523, and a corresponding slow axis 522.

The first and second PM fibers 502 and 514 may be laid adjacent to each other and affixed to each other with an adhesive standard in the art such as epoxy, and disposed within a ferrule 528. A typical ferrule 528 may have a rectangular or "race track" shape opening 530 to accommodate both the first and second PM fibers 502 and 514.

The first and second PM fibers 502 and 514 in pigtail pair 500 may be disposed within ferrule 528 in a predetermined manner. In one disclosed aspect, the second PM fiber 514 may be aligned such that its corresponding stress applying parts form an axis parallel with secondary slow axis 526. The stress applying parts of second PM fiber 514 may each fall on the secondary slow axis of pigtail pair 500. Also, first PM fiber 502 may be aligned such that its stress applying parts fall on an axis having an angle of approximately a 90° angle with respect to the secondary slow axis 526, as indicated by angle α.

Furthermore, the first and second PM fibers 502 and 514 may be disposed such that their corresponding stress applying parts form axes approximately rights angles (90°) with respect to each other. Thus, a method is disclosed herein whereby a plurality of PM fibers may be disposed such that their respective principal axes intersect at approximately right angles (90°). Additionally, a method has been disclosed herein whereby a plurality of PM fibers may be disposed such that their respective principal and secondary axes intersect at approximately right angles.

By disposing PM fibers as disclosed in FIG. 5, the principal axes of the PM fibers comprising the pigtail pair may overlap, and thus the ER of the PM fibers in the pigtail pair may be better maintained. Further, the polarization direction of light traveling through each PM fiber in the pigtail pair may be maintained to a greater degree than pigtail pairs of the prior art because the polarization may be maintained along either the slow or the fast axes of the PM fiber.

While the embodiments disclosed herein have focused on a pigtail pair of PM fibers, it is contemplated that the methods of the present invention may also be applied to groupings of PM fibers greater in number than two.

It is contemplated that a pigtail pair such as that of FIG. 5 may be used to launch the incoming beams Ray 1 and 2 into crystal 206 as disclosed in FIG. 3. Furthermore, the pigtail pair 500 may be optically configured such that the optical axes of crystal 206 (such as shown in FIG. 2C) are aligned with either the fast or slow axis of pigtail pair 500.

Ferrule 528 containing the two PM fibers 502 and 514 may be terminated with conventional angle polish. Furthermore, a conventional optical lens may be used adjacent to the ferrule to realize an optical collimator. As is appreciated by those of ordinary skill in the art, an optical collimator is a preferred method to couple light into a fiber with minimal transmission loss. However, because of the two-fiber configuration of the present invention, the dual-fiber collimator of the present invention will have a divergent angle between the two emanating from the ferrule. To ensure maximum transmission, the divergent angle of the collimator should be configured to match the angle γ.

For the combined light side (adjacent to crystal 202 in FIG. 3), a conventional single mode fiber may be used and terminated with angle polish. An optical lens collimator may also be used to ensure low coupling loss.

Figure 6:
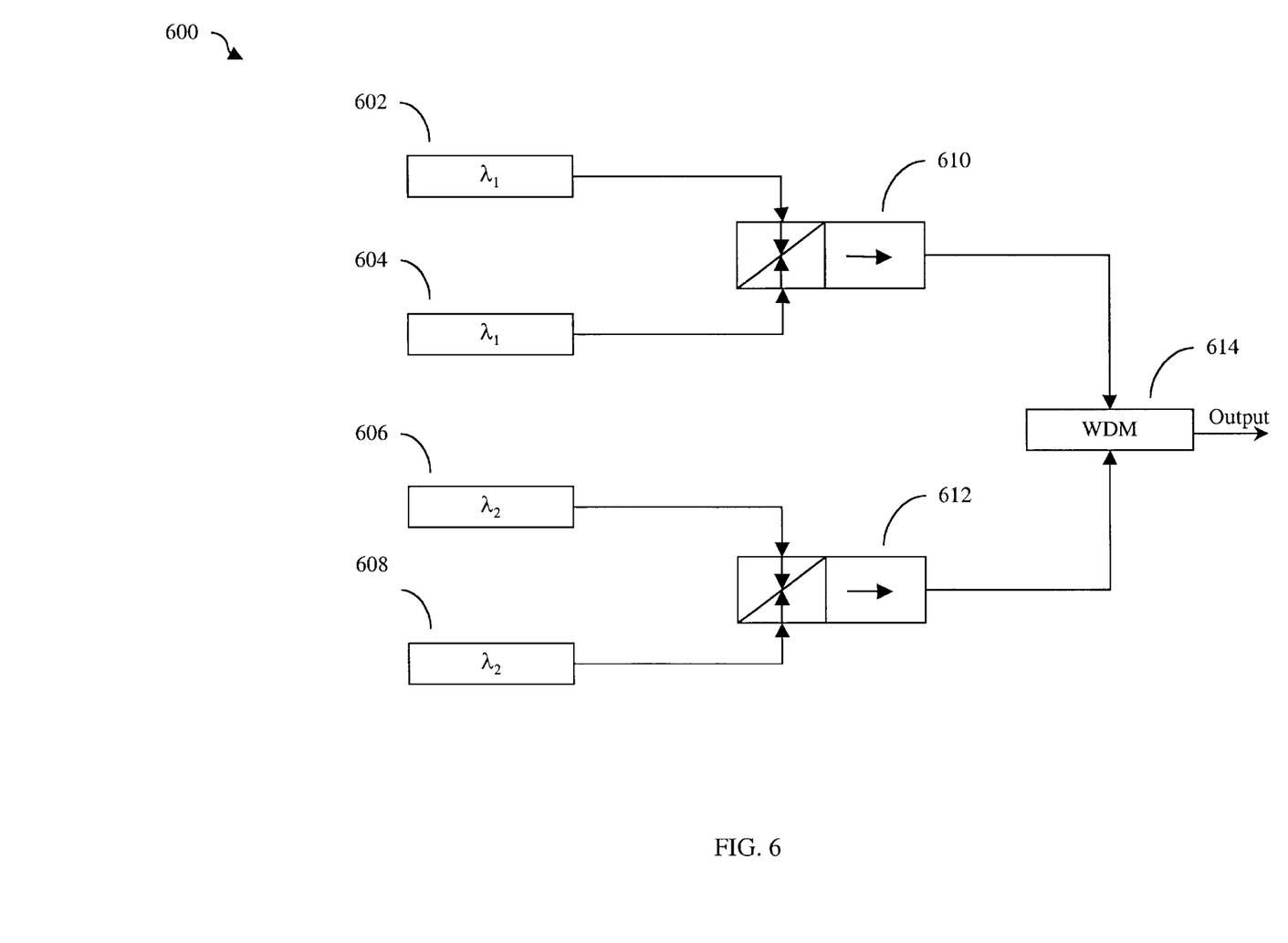
FIG. 6 is a functional block diagram of one aspect of a disclosed integrated polarization beam splitter/combiner and isolator.

Referring now to FIG. 6, a functional block diagram of a Raman pump model 600 incorporating an IPBC according to the present invention is shown. Raman pump model 600 may include $\lambda_1$ sources 602 and 604 which feed IPBC 610, and $\lambda_2$ sources 606 and 608 which feed IPBC 612. For purposes of the present example, IPBC 610 and 612 may be configured according to the present invention as described above. Since no symbol yet exists for an IPBC, the symbol used in FIG. 6 is suggested. IPBC 610 and 612 both feed WDM multiplexer 614, which multiplexes the two signals and provides an output. It is contemplated that the disclosed an IPBC may be employed in a wide variety of devices, including high-power Raman and erbium-doped fiber amplifiers (EDFAs).

As can be seen by inspection of FIG. 6, the Raman pump model of FIG. 6 has fewer discrete components than the Raman pump model of FIG. 1. The configuration of FIG. 6 results in higher performance, lower loss, lower cost, and a smaller footprint, resulting in a dramatic efficiency in design. With this significant efficiency improvement, the disclosed device enables designers to use fewer or lower power pump lasers resulting in more cost-effective networks with higher capacity and longer reach.

As can be seen from FIG. 6, the disclosed IPBC combines the power from two pump lasers while providing isolation from destabilizing back-reflected light. This combined functionality within a single wide-wavelength device also saves network space and lowers manufacturing costs for system providers, and a single device can accommodate a range of pump lasers, resulting in inventory cost reductions. The IPBC may be designed and tested for handling the high optical power levels required in advanced networks.

While embodiments and applications of this disclosure have been shown and described, it would be apparent to those skilled in the art that many more modifications and improvements than mentioned above are possible without departing from the inventive concepts herein. The disclosure, therefore, is not to be restricted except in the spirit of the appended claims.

What is claimed is:

1. An optical device comprising:
    a first birefringent crystal wedge having a wedge angle $\theta$ optically configured to receive two rays incident at an angle $\gamma$ with respect to one another;
    a rotator configured to rotate said two rays received from said first birefringent crystal wedge; and
    a second birefringent crystal wedge also having the wedge angle $\theta$ positioned to receive said two rays from said rotators, wherein said optical device is configured to combine said two rays in a first direction, and isolate said two rays in a second direction and wherein the relationship between the wedge angle $\theta$ and the angle $\gamma$ is defined as $\gamma=2\cdot\arcsin((n_o-n_e)\tan\theta)$, where $n_o$ and $n_e$ are the refractive indices of the first birefringent crystal wedge and of the second birefringent crystal wedge, respectively.

2. The optical device of claim 1, wherein said first and second birefringent crystals comprise a same material.

3. The optical device of claim 2, wherein said first birefringent crystal wedge and said second birefringent crystal wedge have optical axes that are 45° apart.

4. The optical device of claim 3, wherein said two rays have orthogonal polarizations.

5. The optical device of claim 4, wherein said rays are combined interior to said second crystal, and exit said second crystal as a third ray.

6. The optical device of claim 1, further comprising an incoming beam port for launching said two rays through a lens into said first crystal.

7. The optical device of claim 6, wherein said incoming beam ports comprise:
    a plurality of PM fibers, said PM fibers each having corresponding principal axes;
    said plurality of PM fibers disposed together as a grouping, said grouping having corresponding secondary axes; and
    whereby each said plurality of PM fibers is aligned such that said corresponding principal axes of each said plurality of said PM fiber and said secondary axes of said grouping intersect at a predetermined angle.

8. The optical device of claim 7, wherein at least one of said predetermined angles is approximately 0°.

9. The optical device of claim 7, wherein at least one of said predetermined angles is approximately 90°.

10. The optical device of claim 7, wherein at least one of said predetermined angles correspond to said optic axis of said first crystal.

11. An integrated optical polarization beam splitter/combiner and isolator (IPBC) comprising:
    first birefringent means having a wedge angle $\theta$ for receiving and refracting a first ray and a second ray incident at an angle $\gamma$ with respect to one another such that said first ray comprises an e-ray with respect to said first birefringent means, and said second ray comprises an O-ray with respect to said first birefringent means;
    rotating means for rotating said two rays received from said first birefringent means; and
    second birefringent means having the wedge angle $\theta$ for receiving and refracting said first and second rays received from said rotator such that said first ray comprises and o-ray with respect to said second birefringent means and said second ray comprises an e-ray with respect to said second birefringent means, wherein said second birefringent means is optically configured to combine said first and second rays in a forward direction, and said first birefringent means is optically configured to diverge said first and second rays in a reverse direction and wherein the relationship between the wedge angle $\theta$ and the angle $\gamma$ is defined as $\gamma=2\cdot\arcsin((n_o-n_e)\cdot\tan\theta)$, where $n_o$ and $n_e$ are the refractive indices of the first birefringent means and of the second birefringent means, respectively.

12. The IPBC of claim 11, wherein said first and second birefringent means comprise a same material.

13. The IPBC of claim 11, wherein said first and second birefringent means have optical axes that are 45° apart.

14. The IPBC of claim 13, wherein said first and second rays have orthogonal polarizations.

15. The IPBC of claim 14, wherein said rays are combined interior to said second crystal, and exit said second crystal as a third ray.

16. The IPBC of claim 11, further comprising an incoming beam port for launching said two rays though a lens into said first crystal, said port comprising:
    a plurality of PM fibers, said PM fibers each having corresponding principal axes;
    said plurality of PM fibers disposed together as a grouping, said grouping having corresponding secondary axes; and
    whereby each said plurality of PM fibers is aligned such that said corresponding principal axes of each said plurality of said PM fiber and said secondary axes of said grouping intersect at a predetermined angle.

17. A method for combining light in a forward direction and isolating light in a reverse direction comprising:
    refracting a first ray and a second ray incident at a first birefringent crystal wedge at an angle $\gamma$ with respect to one another such that said first ray comprises an e-ray with respect to said first wedge, and said second ray comprises an O-ray with respect to said first wedge, wherein said first wedge has a wedge angle $\theta$;
    rotating said two rays received from said first wedge; and
    refracting said first and second rays received from said rotator at a second birefringent crystal wedge such that said first ray comprises an O-ray with respect to said second wedge; and said second ray comprises an e-ray with respect to said second wedge, wherein said second wedge has a wedge angle $\theta$ and wherein the relationship between the wedge angle $\theta$ and the angle $\gamma$ is defined as $\gamma 2\cdot\arcsin((n_o-n_e)\cdot\tan\theta)$, where $n_o$ and $n_e$ are the refractive indices of the first birefringent crystal wedge and of the second birefringent crystal wedge, respectively.

18. An integrated optical polarization beam splitter/combiner and isolator (IPBC) for use in a Raman pump comprising:

a first birefringent crystal wedge optically configured to receive two rays incident at an angle γ with respect to one another;

a rotator configured to rotate said two rays received from said first wedge; and a second birefringent crystal wedge positioned to receive said two rays from said rotator, wherein said integrated optical polarization beam splitter/combiner and isolator is configured to combine said two rays in a forward direction and isolate said two rays in a reverse direction, and wherein said first birefringent crystal wedge and said second birefringent crystal wedge have the same wedge angle θ and the relationship between the wedge angle θ and the angle γ is defined as $\gamma = 2 \cdot \arcsin((n_o - n_e) \cdot \tan \theta)$, where $n_o$ and $n_e$ are the refractive indices of the first birefringent crystal wedge and of the second birefringent crystal wedge, respectively.

19. The IPBC of claim 18, wherein said first and second birefringent crystals comprise the same material.

20. The IPBC of claim 18, wherein said first birefringent crystal wedge and said second birefringent crystal wedge have optical axes which are 45° apart.

21. The IPBC of claim 18, further comprising an incoming beam port for launching said two rays though a lens into said first crystal.

22. The IPBC of claim 21, wherein said incoming beam ports comprise:

a plurality of PM fibers, said PM fibers each having corresponding principal axes;

said plurality of PM fibers disposed together as a grouping, said grouping having corresponding secondary axes; and whereby each said plurality of PM fibers is aligned such that said corresponding principal axes of each said plurality of said PM fiber and said secondary axes of said grouping intersect at a predetermined angle.

23. The IPBC of claim 22, wherein at least one of said predetermined angles is approximately 0°.

24. The IPBC of claim 22, wherein at least one of said predetermined angles is approximately 90°.

25. The IPBC of claim 22, wherein at least one of said predetermined angles correspond to said optic axis of said first crystal.

26. An integrated optical polarization beam splitter/combiner and isolator (IPBC) for use in a erbium-doped fiber amplifier (EDFA) comprising:

a first birefringent crystal wedge optically configured to receive two rays incident at an angle γ with respect to one another;

a rotator configured to rotate said two rays received from said first wedge; and a second birefringent crystal positioned to receive said two rays from said rotator, wherein said integrated optical polarization beam splitter/combiner and isolator is configured to combine said two rays in a forward direction and isolate said two rays in a reverse direction, and wherein said first birefringent crystal wedge and said second birefringent crystal wedge have the same wedge angle θ and the relationship between the wedge angle θ and the angle γ is defined as $\gamma = 2 \cdot \arcsin((n_o - n_e) \cdot \tan \theta)$, where $n_o$ and $n_e$ are the refractive indices of the first birefringent crystal wedge and of the second birefringent crystal wedge, respectively.

27. The IPBC of claim 26, wherein said first and second birefringent crystals comprise a same material.

28. The IPBC of claim 26, wherein said first birefringent crystal wedge and said second birefringent crystal wedge have optical axes which are 45° apart.

29. The IPBC of claim 26, further comprising an incoming beam port for launching said two rays though a lens into said first crystal.

30. The IPBC of claim 29, wherein said incoming beam ports comprise:

a plurality of PM fibers, said PM fibers each having corresponding principal axes;

said plurality of PM fibers disposed together as a grouping, said grouping having corresponding secondary axes; and whereby each said plurality of PM fibers is aligned such that said corresponding principal axes of each said plurality of said PM fiber and said secondary axes of said grouping intersect at a predetermined angle.

31. The IPBC of claim 30, wherein at least one of said predetermined angles is approximately 0°.

32. The IPBC of claim 30, wherein at least one of said predetermined angles is approximately 90°.

33. The IPBC of claim 30, wherein at least one of said predetermined angles correspond to said optic axis of said first crystal.

* * * * *

UNITED STATES PATENT AND TRADEMARK OFFICE
CERTIFICATE OF CORRECTION

PATENT NO. : 6,628,461 B2
DATED : September 30, 2003
INVENTOR(S) : Huang et al.

It is certified that error appears in the above-identified patent and that said Letters Patent is hereby corrected as shown below:

Title page,
Item [74], *Attorney, Agent, or Firm*, change "Workman, Nydegger & Seeley" to
-- Workman Nydegger --

Column 1,
Line 51, after the "the two" change "signal" to -- signals --

Column 2,
Line 4, "$\gamma$," to -- $\gamma$; --
Line 32, after "whereby each" insert -- of --
Line 34, after "plurality of the PM" change "fiber" to -- fibers --

Column 3,
Line 64, before "depending" remove "based upon the desired"

Column 6,
Line 56, before "IPBC" remove "an"

Column 8,
Lines 6, 51 and 56, change "O-ray" to -- o-ray --
Line 34, after "two rays" change "though" to -- through --
Line 61, change "$\gamma 2$" to -- $\gamma=2$ --

Column 9,
Line 25, after "two rays" change "though" to -- through --

Signed and Sealed this

Fifth Day of October, 2004

JON W. DUDAS
*Director of the United States Patent and Trademark Office*